United States Patent [19]
Umeha et al.

[11] Patent Number: 4,556,532
[45] Date of Patent: Dec. 3, 1985

[54] METHOD FOR MANUFACTURING CAMSHAFT

[75] Inventors: Genkichi Umeha, Tokyo; Shigeru Urano, Omiya; Satoru Kato, Kawaguchi, all of Japan

[73] Assignee: Nippon Piston Ring Co., Ltd., Tokyo, Japan

[21] Appl. No.: 690,231

[22] Filed: Jan. 10, 1985

[30] Foreign Application Priority Data

Feb. 7, 1984 [JP] Japan ................. 59-19400
Apr. 14, 1984 [JP] Japan ................. 59-73884

[51] Int. Cl.⁴ ............................................. B22F 5/06
[52] U.S. Cl. ................................. 419/5; 419/8; 419/9; 419/30; 419/38; 419/47; 419/66
[58] Field of Search ............... 419/5, 8, 9, 30, 38, 419/47, 66

[56] References Cited

U.S. PATENT DOCUMENTS

| 4,251,273 | 2/1981 | Smith et al. | 419/28 |
| 4,503,009 | 3/1985 | Asaka | 419/5 |
| 4,504,312 | 3/1985 | Oaku et al. | 419/12 |

*Primary Examiner*—Stephen J. Lechert, Jr.
*Attorney, Agent, or Firm*—Birch, Stewart, Kolasch & Birch

[57] ABSTRACT

A composite camshaft having a plurality of fitting members, such as cam lobes and journals, fabricated from metal powders having a composition of an Fe-C-Cu system which contains 17-35% by weight of Cu and joined to a steel shaft by a binding effect of Cu, which melts out of the fitting member and full penetrate a clearance between the fitting member and the steel shaft to join them as one body.

6 Claims, 9 Drawing Figures

METHOD FOR MANUFACTURING CAMSHAFT

BACKGROUND OF THE INVENTION

1. Field of the Invention

The invention relates to a method for manufacturing a camshaft for use in a valve mechanism of an internal combustion engine, and more particularly to a process for providing a camshaft in which each fitting member, such as a cam lobe and a journal, is easily bonded to a stem and machine-workable after bonded.

2. Description of the Prior Art

The composite camshaft has a tubular stem of steel and a plurality of fitting members, such as cam lobes and journals, fitted on the tubular stem. The camshaft is light and efficient as compared with the conventional camshaft as casted as one body. Conventionally, the fitting member has been bonded to the stem by either of welding and brazing means, which disadvantageously need many manpowers for handling welding machines or arranging brazing materials. Besides, welding is likely to cause strain in the product due to thermal stress, while brazing fails to provide a sufficient contact between the fitting member and the stem.

There has been proposed another method by which the fitting member is made from a liquid phase sintering material and sintered to join the steel stem. The obtained camshaft is superior in wear resistance but disadvantageously poor in machinability, because the material sintered in the presence of liquid phase is too hard to be machined with ease.

It is known to provide the camshaft with an oil passage extending radially from the outer periphery of each fitting member to the hollow inside of the tubular stem. However, it is costly to form such an oil passage by the known method as disclosed under JP No. 57-154556 in which the oil passage is machined in the fitting member hardened by sintering.

SUMMARY OF THE INVENTION

It is the primary object of the invention to provide a method for manufacturing a camshaft by which the fitting members, such as cam lobes and journals, are easily fitted on and firmly bonded to the stem.

It is another object of the invention to provide a method for manufacturing a camshaft of which the fitting members are fabricated from metal powders and relatively machine-workable after sintered.

It is a further object of the invention to provide a method for manufacturing a camshaft by which no machining is needed to form an oil passage extending radially from the outer periphery of the fitting member to the hollow inside of the stem.

The invention consists in a method comprising the steps of:
shaping a green compact of each fitting member with a bore to be fitted on a stem from a solid-phase sintering material which has a composition of an Fe-C-Cu system containing 17-35% by weight of Cu;
fitting the green compact on the stem; and
sintering the green compact in a furnace.

The method of the invention provides the camshaft with an oil passage radially extending from the outer periphery of each fitting member to the hollow inside of the tubular stem. The method is characterized in that a green compact is composed of two exact halves each having a coupling surface formed with a radial groove, the two exact halves being coupled with each other when fitted on the stem to allow the two radial grooves to define an hole coaxial with one of radial holes previously formed in the stem.

The advantages offered by the invention are mainly that the composite camshaft can be assembled with ease because of needing neither welding machines nor brazing materials and that the fitting members, such as cam lobes and journals, are improved in workability or machinability because of being made from a solid-phase sintering material which is less in hardness than the conventional liquid-phase sintering material, the latter generally becoming highly hard due to formation of phosphorus-containing eutectic or steadite. The solid-phase sintering material, being less in hardness than the liquid-phase sintering material, is superior in wear resistance, because it contains carbon and copper, the former being contributable both to diffusion bondage among particles and to formation of hard carbide, the latter being solidified to improve strength and wear resistance. Still another advantage is that the camshaft with an oil passage can be produced without being machined.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

In accordance with the present invention the composite camshaft has a plurality of fitting members of a solid-phase sintering material, such as cam lobes and journals, metallurgically joined to a steel stem. The solid-phase sintering material has a composition of an Fe-C-Cu system containing 17-35% by weight of Cu.

Copper is contained in the solid-phase sintering material as pure copper or copper alloy. The copper content should be in the above mentioned range. When the amount of copper is less than 17% by weight, the bonding strength between the fitting member and the stem is insufficient. On the other hand, the excess amount over 35% by weight is no other than costly without increasing the bonding strength. Carbon is one of necessary component of the solid-phase sintering material and preferably contained in a range of 0.6 to 1.5% by weight. When the amount of carbon is less than 0.6% by weight, the increased amount of ferrite reduces wear resistance. On the other hand, the amount is more than 1.5% by weight, the hard carbide becomes too large and the product becomes less workable. When Mn, Si, Ni, Mo and the like are optionally added to adjust the properties of the product, such as strength and wear resistance, the sufficient amount of them is 0.2-4.0% by weight. The sintering material also contains a tiny amount of companion impurities. The inventive method depends on copper which melts out of the solid-phase sintering material to diffuse and penetrate into the stem during sintering, so that the solid-phase sintering material is required to have an appropriate porosity, preferably 10-40% by volume of pores.

The solid-phase sintering material is shaped as a green compact of each fitting member, such as the cam lobe and journal, provided with a bore for fitting engagement with a stem. The bore generally has its diameter almost equal to that of the stem. The fitting members are fitted at the predetermined positions on a single stem. The stem is either solid or tubular and preferably made of such a material as JIS STKM 13 (Machine-Structural Carbon Steel Tubes) the component of which consists of 0.17% by weight of C, 0.14% by weight of Si, 0.54% by weight of Mn, 0.013% by weight of P, 0.004% by weight of S, and the balance being iron.

After the fitting member is fitted at the predetermined position on the stem, the assembly is sintered in a furnace. The sintering conditions are so selected that copper contained in the solid-phase sintering material is molten to diffuse and penetrate into the stem. For example, the sintering is done at 1100°-1200° C. for 30-150 minutes in which copper is molten out of the sintering material to penetrate into a clearance between the bore and the stem while sintering and then solidified to join the fitting member firmly with the stem.

The present invention will now be described in detail below with reference to the drawings wherein like numbers are used in the various views to indicate identical elements.

Figure 1:
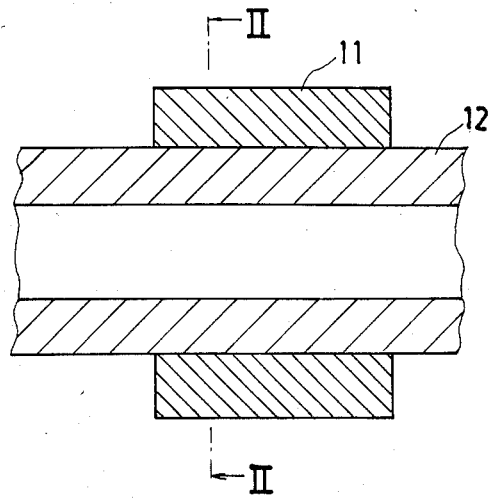
FIG. 1 is a longitudinal section of the camshaft according to the invention.
Figure 2:
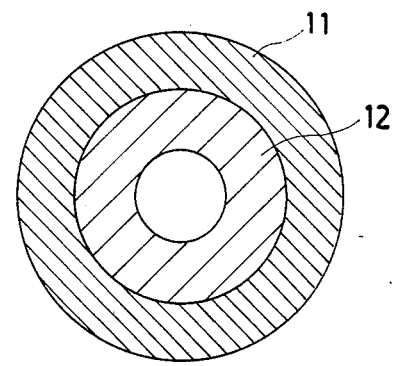
FIG. 2 is a cross-section taken along the line II—II of FIG. 1.

Referring now to FIGS. 1 and 2, the journal 11 is made from a solid-phase sintering material having an Fe-C-Cu system consisting of 20% by weight of Cu, 1.0% by weight of C, the balance being iron and formed with a bore 13 which is fitted on a tubular stem 12 of steel. Thereafter, it is sintered in a furnace. Copper is molten out of the solid-phase sintering material to penetrate into a clearance between the journal 11 and the stem 12 and then solidified to join the journal with the stem.

Figure 3:
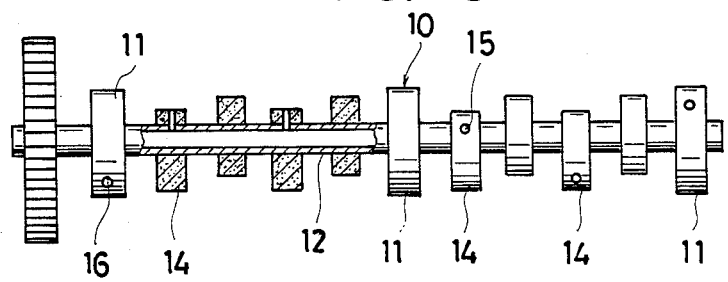
FIG. 3 is a partly sectional elevation of another embodiment.

As seen in FIG. 3, the reference mark 10 indicates the camshaft generally consisting of a plurality of parts, such as journals 11 and cam lobes 14, fitted on a tubular stem of steel. Journals 11 and cam lobes 14 are closely joined with the tubular stem 12 and formed with oil holes 15, 16 which extend from the sliding surfaces of the cam lobes and the journals to the hollow inside of the stem. The sliding surfaces are centrifugally supplied with oil through the oil holes from the tubular stem in which oil is reserved while the camshaft is rotated by a non-illustrated engine. The oil supplied to the sliding surface also lubricates the valve mechanism in the engine.

Figure 4:
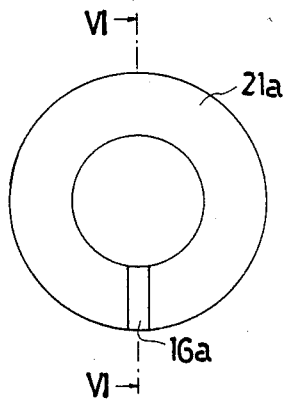
FIGS. 4 and 5 are side elevations of two exact halves of a green compact of a journal to be coupled with each other, showing the respective coupling surfaces.
Figure 5:
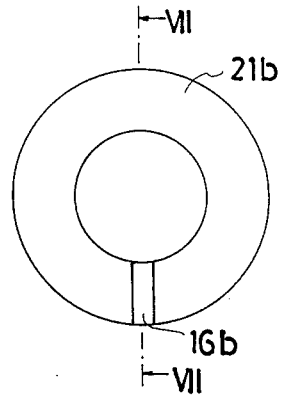
Figure 6:
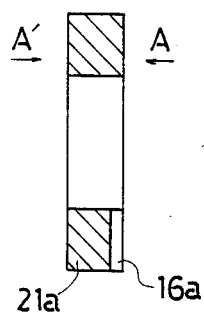
FIGS. 6 and 7 are sections taken along the lines VI—VI and VII—VII of FIGS. 4 and 5, respectively.

In the method of the invention as shown in FIGS. 4 to 7, a green compact of each fitting member in the making is made from powders of the same material as in FIGS. 1 and 2 bu previously shaped in the form of two exact halves. For example, the metal powders are compressed in the form of two exact halves 21a of FIGS. 4 and 6, 21b of FIGS. 5 and 7 each having a radial groove 16a, 16b formed in the coupling surface to be coupled with the other. The halves 21a, 21b are respectively compressed in the axial direction shown by the arrow A-A' of FIG. 6 and B-B' of FIG. 7. FIGS. 4 and 6 show the respective coupling surfaces of two halves 21a, 21b.

Figure 8:
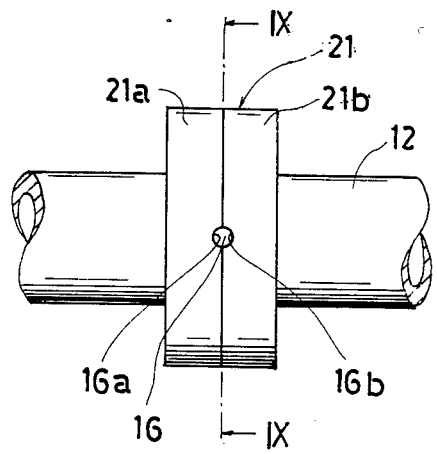
FIG. 8 is an enlarged elevation of one part of the camshaft, showing a journal fitted on a tubular stem.
Figure 7:
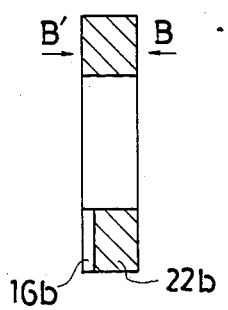

As seen in FIG. 8, the paired halves 21a, 21b are coupled with each other to form a green compact 21 for making a journal, while the individual radial grooves 16a, 16b are exactly alined to define an oil hole 16. Thereafter, the coupled green compact 21 is fitted on the tubular stem 12 to assemble a camshaft. The tubular stem 12 is generally made of steel and previously formed with a plurality of radial holes at the respective positions to aline with an oil hole formed in each fitting member.

Figure 9:
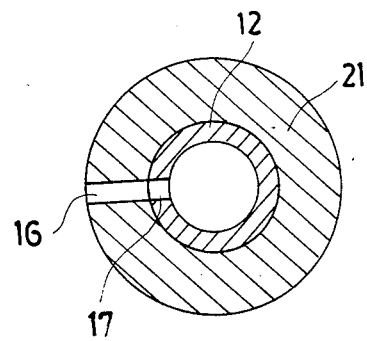
FIG. 9 is a section taken along the line IX—IX of FIG. 8.

As seen in FIG. 9, the oil hole 16 in the green compact 21 is alined with one of radial holes 17 in the stem 12. A straight copper pipe can be inserted through the oil hole in the journal and one of the oil holes in the shaft from the sliding surface into hollow inside of the shaft to fix a relative position between the journal and the stem. Thus assembled camshaft is sintered in a non-illustrated furnace to convert the green compacts to the fitting members sintered. Copper melts out of each of the halves to penetrate a clearance among the two halves and the stem and then solidify therein with the result that the two halves and the stem join firmly as one body.

What is claimed is:

1. A method for manufacturing a camshaft comprising of the steps:
    shaping a green compact of each fitting member with a bore for fitting engagement with a stem from a solid-phase sintering material having a composition of an Fe-C-Cu system which contains 17-35% by weight of Cu;
    fitting said green compact on said stem; and
    sintering said green compact fitted on said stem in a furnace, whereby said Cu melts out of said green compact and penetrates a clearance between said stem and said green compact as a binder therebetween.

2. The method of claim 1, wherein said green compact has 10-40% by volume of pores.

3. The method of claim 1, wherein said stem is of steel.

4. The method of claim 3, wherein said stem is tubular and formed with a plurality of radial holes, said green compact consisting of two exact halves each having a coupling surface formed with a radial groove, said two halves being so coupled with each other on said stem that said two radial grooves define an oil hole coaxial with one of said radial holes in said stem.

5. The method of claim 4, wherein said fitting member is a journal.

6. The method of claim 2, wherein said stem is of steel.

* * * * *